United States Patent [19]

Shamshoum et al.

[11] Patent Number: 5,817,591
[45] Date of Patent: Oct. 6, 1998

[54] POLYOLEFIN CATALYST FROM METAL ALKOXIDES OR DIALKYLS, PRODUCTION AND USE

[75] Inventors: Edwar S. Shamshoum, Houston; Christopher G. Bauch, Seabrook, both of Tex.

[73] Assignee: Fina Technology, Inc., Dallas, Tex.

[21] Appl. No.: 483,110

[22] Filed: Jun. 7, 1995

[51] Int. Cl.$^6$ .............. B01J 31/00; B01J 37/00; C08F 4/02; C08F 4/60
[52] U.S. Cl. .............. 502/127; 502/104; 502/107; 502/125; 502/134; 526/124.3
[58] Field of Search .................. 502/104, 107, 502/115, 125, 128, 134, 127

[56] References Cited

U.S. PATENT DOCUMENTS

| | | | |
|---|---|---|---|
| 4,220,554 | 9/1980 | Scata et al. | 502/134 |
| 4,295,992 | 10/1981 | Gibbs | 526/128 |
| 4,342,855 | 8/1982 | Akimoto et al. | 526/124 |
| 4,472,521 | 9/1984 | Band | 502/104 |
| 4,607,019 | 8/1986 | Best | 502/119 |
| 4,649,128 | 3/1987 | Rekers et al. | 502/109 |
| 4,673,661 | 6/1987 | Löfgren et al. | 502/111 |
| 4,724,255 | 2/1988 | Löfgren et al. | 526/128 |
| 4,820,672 | 4/1989 | Mehta | 502/115 |
| 4,855,271 | 8/1989 | McDaniel et al. | 502/107 |
| 4,937,300 | 6/1990 | McDaniel | 526/125 |
| 5,063,188 | 11/1991 | Speca | 502/107 |
| 5,075,270 | 12/1991 | Brun et al. | 502/107 |
| 5,108,972 | 4/1992 | Wang et al. | 502/125 |
| 5,547,912 | 8/1996 | Kataoka et al. | 502/127 |

FOREIGN PATENT DOCUMENTS

| | | |
|---|---|---|
| 0010746 | 5/1980 | European Pat. Off. . |
| 0038565 | 10/1981 | European Pat. Off. . |
| 0114526 | 8/1984 | European Pat. Off. . |
| 0172961 | 3/1986 | European Pat. Off. . |
| 2032105 | 2/1990 | Japan . |

*Primary Examiner*—Mark L. Bell
*Assistant Examiner*—J. Pasterczyk
*Attorney, Agent, or Firm*—Jimmy D. Wheelington; M. Norwood Cheairs

[57] ABSTRACT

A method of forming a polyolefin catalyst component which includes chlorinating a magnesium alkoxide, solubilizing the chlorinated magnesium alkoxide into a hydrocarbon solvent utilizing an alcohol, and then precipitating a solid from the solvent by the dropwise addition of titanium tetrachloride. Two more titanation steps follow, the first with an electron donor, the second without an electron donor, to produce a catalyst having an improved yield of polymer.

9 Claims, No Drawings

POLYOLEFIN CATALYST FROM METAL ALKOXIDES OR DIALKYLS, PRODUCTION AND USE

BACKGROUND OF THE INVENTION

1. Field of the Invention

The present invention relates to catalysts, a method of making catalysts, and a process for polymerizing. In another aspect, the present invention relates to polyolefin catalysts, a method of making polyolefin catalysts, and a method of polymerizing olefins. In even another aspect, the present invention relates to polyolefin catalysts derived from metal alkoxides or metal dialkyls, a method of making polyolefin catalysts from metal alkoxides or metal dialkyls, and a method of polymerizing olefins from such catalysts. In still another aspect, the present invention relates to polyolefin catalysts derived from metal alkoxides or metal dialkyls having higher activity, a method of making polyolefin catalysts from metal alkoxides or metal dialkyls utilizing a series of washes, and a method of polymerizing olefins from such catalysts.

2. Description of the Related Art

Having been around since the early 1950's, Ziegler-type polyolefin catalysts, their general methods of making, and subsequent use, are well known in the polymerization art.

However, while much is known about Ziegler-type catalysts, there is a constant search for improvements in their polymer yield, catalyst life, catalyst activity, and in their ability to produce polyolefins having certain properties.

U.S. Pat. No. 4,472,521, issued Sep. 18, 1984 to Band, discloses a polyolefin catalyst made by contacting a $Mg(OR)_2$ and/or $Mn(OR_2)$ with titanium tetrachloride, then with a titanium tetrachloride halogenating agent, and then with an electron donor.

U.S. Pat. No. 4,673,661, issued Jun. 16, 1987, and U.S. Pat. No. 4,724,255, issued Feb. 9, 1988, both to Lofgren et al. discloses a polyolefin catalyst component made by chlorinating a magnesium alkyl which is then contacted with titanium tetrachloride, a Lewis base, and then at least once with titanium tetrachloride in the absence of a Lewis base. Lofgren et al. teaches the criticality of an electron donor at the first titanium tetrachloride treatment step and further teach that away from the presence of an electron donor at subsequent titanation steps.

U.S. Pat. No. 4,855,271, issued Aug. 8, 1989, and U.S. Pat. No. 4,937,300, both to McDaniel et al. disclose a polyolefin catalyst derived from alumina impregnated with magnesium alkoxide, which is subsequently contacted with a lower order alcohol, chlorinated with silicon tetrachloride, and subsequently etched with titanium tetrachloride.

U.S. Pat. No. 5,075,270, issued Dec. 24, 1991 to Brun et al. discloses a polyolefin catalyst made by reacting a magnesium alkoxide with an aluminosiloxane derivative, which product is then chlorinated with silicon tetrachloride, followed by transition metal treatment with titanium tetrachloride, with an electron donor optionally associated with the transition metal.

Even with these prior art methods there is still a need for improved polyolefin catalysts, methods of their making, and methods of polymerizing.

There is another need for polyolefin catalysts having improved yields.

These and other needs in the art will become apparent to those of skill in the art upon review of this patent specification.

SUMMARY OF THE INVENTION

It is one object of the present invention to provide for improved polyolefin catalysts, methods of their making, and methods of polymerizing.

It is another object of the present invention to provide for polyolefin catalysts having improved yields.

These and other objects of the present invention will become apparent to those of skill in the art upon review of this patent specification.

According to one embodiment of the present invention there is provided a process for preparing a polyolefin catalyst. The method first includes contacting a metal alkoxide, such as magnesium ethoxide, or a metal dialkyl, such a magnesium dibutyl, with a halogenating agent, such as silicon tetrachloride, to form (A) an alkoxy metal halide or a alkyl metal halide. The method next includes contacting this product (A) with a hydrocarbon solvent to form a slurry. This product (A) is then solubilized into the solvent by the addition of alcohol. A solid (B) is then precipitated from the solution by dropwise addition of titanium tetrachloride. This precipitated solid (B) is subsequently treated by a second titanation step which includes an electron donor, and by a third titanation step without an electron donor to form a catalyst component (C).

According to another embodiment of the present invention there is provided a process for preparing a polyolefin catalyst. The method includes first contacting an alkoxy or alkyl metal halide with a hydrocarbon solvent to form a slurry. To this slurry is added an alcohol to solubilize the alkoxy or alkyl metal halide into the hydrocarbon solvent and form a solution. Next, a solid is precipitated from the solution by dropwise addition of titanium tetrachloride. This solid is subsequently subjected to two more titanation steps to form a catalyst product.

DETAILED DESCRIPTION OF THE INVENTION

The method of the present invention for making a catalyst component generally includes the steps of halogenating a metal alkoxide or metal dialkyl, which is then followed by three subsequent titanation treatments.

Metal alkoxides or metal dialkyls suitable for use in the present invention include any that which when utilized in the present invention will yield a suitable polyolefin catalyst. Preferred metal alkoxides and dialkyls include Group IIA and VIIB metal alkoxides and dialkyls. More preferably the metal alkoxide or dialkyl is a magnesium or manganese alkoxide or dialkyl, most preferably a magnesium alkoxide or dialkyl. Metal alkoxides are preferred over metal dialkyls. The metal alkoxide or dialkyl may also include hydroxyl, halogen or other substituent groups as long as the alkoxide compound may be solubilized in the reaction liquid.

The general formula of the preferred metal alkoxide or dialkyl is $M(OR)_2$ and $MR_2$, wherein M is any suitable metal, and R is a hydrocarbyl or substituted hydrocarbyl moiety having from 1 to 20 carbon atoms.

In the above formula, M is preferably a Group IIA and VIIB metal, most preferably Mg or Mn. In the above formula, R is preferably a hydrocarbyl or substituted hydrocarbyl moiety having from 2 to 10 carbon atoms, and more preferably R is a hydrocarbyl or substituted hydrocarbyl moiety having from 2 to 6 carbon atoms, and most preferably, R has from 2 to 4 carbon atoms.

Examples of preferred species of metal alkoxides include magnesium ethoxide, magnesium butoxide, manganese ethoxide, and manganese butoxide. The most preferred metal alkoxide species is magnesium ethoxide. While not required, it is preferred that the magnesium alkyls be soluble in a hydrocarbon solvent. Examples of suitable magnesium dialkyls include dibutyl magnesium and butylethyl magnesium Halogenating agents useful in the halogenating step for halogenating the metal alkoxide and metal dialkyl include any halogenating agent which when utilized in the present invention will yield a suitable polyolefin catalyst. Chlorides are the preferred halogenating agents.

Halogenating agents are those compounds which can cause replacement of an alkoxide group or one of the alkyl groups of the dialkyls with a halogen. Group III, Group IV and Group V halides may be employed, as may hydrogen halides, or the halogens themselves. Specific examples of preferred halogenating agents are $BCl_3$, $AlCl_3$, $CCl_4$, $SiCl_4$, $TiCl_4$, $ZrCl_4$, $VOCl_3$, $VOCl_2$, $CrOCl_2$, $SbCl_5$, $POCl_3$, $PCl_5$, and $HfCl_4$. More preferred halogenating agents are $SiCl_4$ and $TiCl_4$, with the most preferred halogenating agent being $SiCl_4$. Other halogenating agents include alkyl halo silanes of the formula $R_xSiX_{(4-x)}$, wherein X is a halogen, R is a substituted or unsubstituted hydrocarbyl having 1 to 20 carbon atoms, and X is a halogen.

This initial halogenating of the metal alkoxide or metal dialkyl compound is generally conducted in a hydrocarbon solvent under an inert atmosphere. Nonlimiting examples of suitable solvents include toluene, heptane, hexane, octane and the like. The preferred solvents are toluene and heptane.

In this halogenating step, the mole ratio of metal alkoxide or metal dialkyl to halogenating agent is generally in the range of about 6:1 to about 1:3, preferably in the range of about 3:1 to about 1:2, and more preferably in the range of about 2:1 to about 1:2.

This initial halogenating step is generally carried out at a temperature in the range of about 0° C. to about 100° C., a pressure in the range of about 15 psi to about 50 psi, and for a reaction time in the range of about 0.5 to about 4 hours. Preferably, the halogenating step is carried out at a temperature in the range of about 20° C. to about 90° C., a pressure in the range of about 15 psi to about 30 psi, and for a reaction time in the range of about 1 hour to about 2 hours.

Once the halogenating step is carried out and the metal alkoxide or metal dialkyl halogenated, the precipitated solid halide product (A) is recovered by any suitable method, and washed with a hydrocarbon solvent to remove any reactants from the halogenating step. The metal halide is then subjected to a series of three titanation treatments.

The first titanation step is generally carried out by first slurrying the halogenation product (A). Nonlimiting examples of suitable hydrocarbons solvent include heptane, hexane, toluene, octane and the like. The product (A) is then solubilized in the hydrocarbon solvent by the addition of a suitable alcohol and heating as is well known in the art. While it is believed that almost any alcohol may be utilized, it is preferred that a higher order branched alcohol, for example, 2-ethyl-1-hexanol, be utilized. Generally, the alcohol utilized will have at least 3, preferably at least 4, more preferably at least 5, and most preferably at least 6 carbon atoms.

The amount of alcohol added to the slurry must be suitable to cause solubilization of the product A into the hydrocarbon solvent. Generally the amount of alcohol added will be in the range of about 0.5 to about 4 equivalents (equivalents are relative to the magnesium compound throughout), preferably in the range of about 1 to about 3 equivalents.

Once the alcohol is added, the hydrocarbon solvent/product A is then heated to solubilize the product A into the hydrocarbon solvent. The slurry is generally heated to a temperature suitable for the solubilization of the solid product A into the hydrocarbon solution. Such a temperature is generally in the range of about 50° C. to about 150° C., preferably in the range of about 70° C. to about 115° C.

After solubilization of the product A by addition of alcohol and heating, a solid product (B) is precipitated at room temperature by the addition of titanium tetrachloride.

The amount of titanium tetrachloride utilized must be sufficient to precipitate a solid product from the solution. In general, the amount of titanium tetrachloride utilized will generally be in the range of about 0.5 to about 5 equivalents, preferably in the range of about 1 to about 4, and most preferably in the range about 1.5 to about 2.5 equivalents (based on the magnesium compound).

The solid product precipitated in this first titanation step is then recovered by any suitable recovery technique, and then washed with a hydrocarbon solvent.

The second titanation step is generally carried out by slurrying the solid recovered from the first titanation step in a hydrocarbon solvent. Hydrocarbon solvents listed as suitable for the first titanation step may be utilized. The slurry is then heated slightly to a temperature in the range of about 50° C. to about 90° C. and titanium tetrachloride added. In general, the amount of titanium tetrachloride utilized will generally be in the range of about 0.5 to about 5 equivalents, preferably in the range of about 1 to about 4 equivalents, and most preferably in the range of about 1.5 to about 2.5.

Following the addition of the titanium tetrachloride, the slurry is then further heated to a temperature in the range of about 90° C. to about 150° C., preferably to a temperature in the range of about 100° C. to about 125° C. The slurry is held at this elevated temperature for a holding period in the range of about 0.5 hours to about 8 hours, preferably for a holding period in the range of about 1 hour to about 4 hours. Subsequently, the solid is recovered and washed with a hydrocarbon solvent.

The third titanation step is generally carried in a similar fashion as the second titanation step. The solid recovered from the second titanation step is slurried in a hydrocarbon solvent. Hydrocarbon solvents listed as suitable for the first titanation step may be utilized. The slurry is then heated slightly to a temperature in the range of about 50° C. to about 90° C. and titanium tetrachloride added. In general, the amount of titanium tetrachloride utilized will generally be in the range of about 0.5 equivalents to about 5 equivalents, preferably in the range of about 1 equivalent to about 4 equivalent, and most preferably in the range about 1.5 to about 2.5 equivalents.

Following the addition of the titanium tetrachloride, the slurry is then further heated to a temperature in the range of about 90° C. to about 150° C., preferably to a temperature in the range of about 100° C. to about 125° C. The slurry is held at this elevated temperature for a holding period in the range of about 0.5 hours to about 8 hours, preferably for a holding period in the range of about 1 hour to about 4 hours. Subsequently, after recovery and washing with a hydrocarbon solvent, a product (C), a polyolefin cocatalyst is formed.

In the practice of the present invention it is generally desirable to utilize an electron donor for treating either the halogenation product (A) or the solid products (C) of the titanation steps. Preferably, electron donors are utilized for treating the halogenation product (A), or utilized in the second titanation step. Most preferably, the electron donor is added to the slurry in the second titanation step.

Electron donors for use in the preparation of polyolefin catalysts are well known, and any suitable electron donor may be utilized in the present invention which will provide a suitable catalyst.

Electron donors, also known as Lewis bases, are organic compounds of oxygen, nitrogen, phosphorous, or sulfur which can donate an electron pair to the catalyst.

The electron donor may be a monofunctional or polyfunctional compound, advantageously selected from among the aliphatic or aromatic carboxylic acids and their alkyl esters, the aliphatic or cyclic ethers, ketones, vinyl esters, acryl derivatives, particularly alkyl acrylates or methacrylates and silanes. A preferred example of a suitable electron donor is di-n-butyl phthalate.

The amount of electron donor utilized will generally vary over a broad range and is generally in the range of about 0.01 to about 2 equivalents, preferably in the range of about 0.05 to about 0.5 equivalents.

The halogenation product (A) may be contacted with the electron donor for a contacting period in the range of about 0.5 hours to about 4 hours, preferably in the range of about 1 hours to about 2 hours.

Suitable temperatures for the electron donor step are generally in the range of about 20° C. to about 90° C., with suitable pressures in the range of about 15 psi to about 50 psi.

The cocatalyst component made by the above described process may be combined with an organoaluminum cocatalyst component to form a catalyst system suitable for the polymerization of olefins. Typically, the cocatalysts which are used together with the transition metal containing catalyst component are organometallic compounds of Group Ia, IIa, and IIIa metals such as aluminum alkyls, aluminum alkyl hydrides, lithium aluminum alkyls, zinc alkyls, magnesium alkyls and the like. Preferable organometallic compounds employed in the practice of the present invention are trialkylaluminum cocatalysts, most preferably trialkylaluminum.

External donors which may be utiized in the preparation of a catalyst according to the present invention include those known in the art, and include alkoxysilanes.

The catalysts of the present invention can be used for the polymerization of any type of $\alpha$-olefins. For example, the present catalyst is useful for catalyzing ethylene, propylene, butylene, pentene, hexene, 4-methylpentene and other $\alpha$-alkenes having at least 2 carbon atoms, and also for mixtures thereof. Preferably, the catalysts of the present invention are utilized for the polymerization of propylene to produce polypropylene, most preferably isotactic polypropylene.

Olefin polymerization methods are well known in general, and any suitable method may be utilized.

EXAMPLES

In the following Examples, catalysts have been synthesized from ethoxymagnesium chloride or magnesium ethoxide that had been chlorinated with $SiCl_4$. EtOMgCl, that had been dissolved in heptane by the addition of 2-ethyl hexanol, was treated with titanium tetrachloride to produce a high yield and selectivity catalyst.

Treatment of magnesium ethoxide with silicon tetrachloride prior to titanation gives low yield catalyst. However, addition of 2-ethyl hexanol after silicon tetrachloride treatment allows the production of a high yield and selectivity catalyst.

All reactions were carried under a nitrogen atmosphere using standard Schlenk and cannula techniques. Ti analysis was performed by spectrophotographic determination of peroxide complex. The Mg analysis was performed by EDTA titration and Cl analysis by $AgNO_3$ titration.

Reagents

Titanium (IV) chloride ($TiCl_4$), 1-chlorobutane and magnesium powder (–50 mesh) were used as received from Aldrich. Commercial $Mg(OEt)_2$ (Hüls) was used after vacuum drying at 120° C. overnight. Di-n-butylphthalate (Aldrich) was vacuum distilled from anhydrous potassium carbonate. Heptane and toluene were purified by successive treatment through columns of 3A molecular sieves, Alcoa high surface area alumina and BASF R3-11 catalyst (oxygen scavenger). Ethanol and 2-ethyl-1-hexanol were distilled from their respective magnesium salts.

Synthesis of Ethoxy Magnesium Chloride

The procedure was as follows:

A 3-neck flask was charged with magnesium powder (17.4 g, 0.71 mol) and iodine (0.4 g) and fitted with a dropping funnel, condensor and septum. Heptane (500 mL) was added and the slurry was heated to 90 ° C. for 110 minutes. Chlorobutane (75 mL, 0.71 mol) was added cautiously to this stirred slurry. The reaction was allowed to continue for 3 additional hours at 90 ° C. Ethanol (32.86 g, 0.71 mol) was then added to the white solid butyl magnesium chloride over 90 minutes. The slurry was allowed to cool to room temperature and settle. Solvent was removed by cannula and the solid dried in vacuo.

Catalyst Syntheses

Solubilized Ethoxy Magnesium Chloride plus Titanium Tetrachloride at Room Temperature (Samples 1, 2 and 3)

To a 500 mL round-bottom flask, was added 10 g (0.095 mol) ethoxymagnesium chloride (EtOMgCl) which was then slurried in 250 mL heptane. The slurry was heated to 55° C. and 20 mL 2-ethyl-1-hexanol was syringed into the flask. The flask was heated to 65° C. dissolving the white solid leaving a small amount of fine gray solid. The solution was filtered through a glass frit into a 3-neck flask fitted with a dropping funnel and a condenser. The solution was cooled to room temperature and 20 mL $TiCl_4$ was added dropwise to produce a pale precipitate. The slurry was then heated to 100° C. over 30 minutes and kept at 100° C. for one hour. The solid was allowed to cool to 60° C. and settle. The supernatant was decanted and the solid was washed two times with heptane at 60° C. The solid was slurried in toluene and heated to 85° C. Titanium (IV) chloride (20 mL) was added dropwise to the stirred slurry followed by 3.0 mL of DNBP. The slurry was then heated to 115° C. for 2.5 h and washed twice with toluene at 90° C. The solid was slurried in 80 mL of toluene, treated with 20 mL $TiCl_4$ and heated to 115° C. for two hours. The slurry was cooled to 90° C. and the solid allowed to settle. The supernatant was decanted and the solid washed five times with heptane at 40° C. The solid was dried in vacuo for two hours at 50° C.

Solubilized Ethoxy Magnesium Chloride plus Titanium Tetrachloride at 0° C. (Sample 4)

The catalyst was prepared the same as Sample 1 except that the $TiCl_4$ was added to the solubilized EtOMgCl at 0° C.

Solubilized Ethoxy Magnesium Chloride plus Titanium Tetrachloride at Room Temperature in the Presence of Internal Donor (Sample 5)

The catalyst was prepared the same as Sample 1 except that 2 mL of DNBP was added both to the solubilized EtOMgCl and after the second titanation.

Solid Magnesium Ethoxide plus Silicon Tetrachloride followed by 2-ethyl hexanol (Sample 6)

The procedure described for $TiCl_4$ treatment of Sample 1 was performed except, that instead of starting with EtOMgCl, the following magnesium species was used: 10 g of $Mg(OEt)_2$ was slurried in 80 mL toluene and treated with 10 mL $SiCl_4$ (0.087 mol) at 80° C. for one hour. After cooling the solid to room temperature, 27 mL of 2-ethyl 1-hexanol was added dropwise to produce a gelatinous solid.

Catalyst Preparation Starting from Magnesium Ethoxide and Silicon Tetrachloride (Samples 7 & 8)

$Mg(OEt)_2$ (10 g. 0.088 mol) was slurried in 80 mL toluene and heated to 80° C. $SiCl_4$ (20 mL, 0.17 mol) was added over seven minutes and the reaction was stirred for one hour. The supernatant liquid was removed by cannula and the solid was washed two times with 100 mL toluene at 80° C. The solid was then slurried in 80 mL toluene and treated with 20° mL $TiCl_4$ and 3.0 mL DNBP. The slurry was heated to 115° C. for 2 hours and washed twice with toluene at 90° C. The solids were slurried in 80 mL toluene at 80° C. and treated with 20 mL $TiCl_4$. The slurry was heated to 115° C. for 2 hours. The slurry was then cooled to 90° C. and the solid allowed to settle. The supernatant was decanted and the solid washed 5 times with heptane at 90° C. The solid was then dried in vacuo for 2 hours at 50° C. Catalyst Sample 8 was prepared with only one titanation.

Polymerizations

All polymerizations were carried using the conditions described in Table 1. A 2 liter autoclave was charged with 1.4 liters of liquid propylene and 16 mmol $H_2$. To this was charged 10 mg catalyst, 10 mmol triethyl aluminum ("TEAL") and 0.1 mmol CMDS. The mixture was heated to 70° C. and maintained for 60 minutes. Polymerization was quenched by venting propylene and exposure to air. The polymer was then dried at 60° C.

TABLE 1

Polymerization Standard Conditions

| Reagents: | | Conditions: | |
|---|---|---|---|
| catalyst: | 10 mg | temp.: | 70° C. |
| TEAL: | 1.0 mmol | time: | 1 hour |
| CMDS: | 0.1 or 0.5 mmol | propylene: | 1.4 L (0.72 kg) |
| ) | | precontact: | standard, one bomb |
| Al/Si: | 10 or 2 | | |
| hydrogen: | 16 or 48 mmol (110 or 330 Δpsig) | | |

TABLE 2

Catalyst Analysis

| Catalyst | % Ti | % Mg | % Cl | % DBP | % BEP | % DEP | Total |
|---|---|---|---|---|---|---|---|
| 1 | 3.1 | 17.6 | 59.8 | 17.95 | 0.41 | 0.36 | 18.72 |
| 6 | 3.4 | 17.6 | 56.3 | 18.90 | 0.08 | — | 18.98 |
| 2 | 2.3 | 20.0 | 53.2 | 11.71 | — | — | 11.71 |
| 4 | 2.8 | 11.5 | 64.7 | 17.93 | — | — | 17.93 |
| 5 | 4.4 | 15.6 | 53.7 | 31.1O | — | — | 31.10 |
| 3 | 5.2 | 15.6 | 57.5 | 30.25 | — | — | 30.25 |

Polymer Characterization

The catalysts were evaluated by polymerization at Al/Si= 10 and 2 using 16 and 48 mmol hydrogen. The characterization of the polymers is shown in the following Table 3.

TABLE 3

| Catalyst | Yield | BD | Al/Si | $H_2$ | MF | % XS | $M_n$ | $M_w$ | D | $T_m$ | ΔHm | $T_r$ | $ΔH_r$ |
|---|---|---|---|---|---|---|---|---|---|---|---|---|---|
| | | | | | | | | GPC | | | | DSC | |
| 7 | 22 | 0.17 | 50 | 110 | 3.7 | 4.80 | 48409 | 370223 | 7.70 | 160.3 | 91.93 | 109.01 | −93.42 |
| 7 | 26 | 0.19 | 50 | 330 | 26.4 | 4.20 | 40948 | 259089 | 6.33 | 160.90 | 95.04 | 109.28 | −95.16 |
| 8 | 5 | — | 50 | 110 | — | — | — | — | — | — | — | — | — |
| 6 | 200 | 0.43 | 10 | 110 | 2.3 | 6.48 | 40913 | 347606 | 8.49 | 161.66 | 87.92 | 109.30 | −91.40 |
| 6 | 146 | 0.41 | 2 | 110 | 1.0 | 4.32 | 97758 | 535380 | 5.48 | 162.36 | 68.31 | 108.80 | −72.99 |
| 6 | 186 | 0.44 | 2 | 330 | 8.4 | 3.44 | 42176 | 294910 | 6.99 | 160.79 | 93.72 | 108.33 | −96.12 |
| 1 | 224 | 0.33 | 10 | 110 | 1.3 | 4.24 | 93842 | 467923 | 4.99 | 161.94 | 95.40 | 111.67 | −97.07 |
| 1 | 292 | 0.36 | 10 | 330 | 4.6 | 4.12 | 56134 | 325146 | 5.79 | 162.74 | 98.00 | 112.20 | −98.84 |
| 1 | 188 | 0.36 | 2 | 110 | 1.3 | 3.32 | 93310 | 483224 | 5.12 | 162.52 | 87.96 | 110.24 | −97.43 |
| 2 | 180 | 0.42 | 10 | 110 | 1.6 | 2.32 | 62843 | 444811 | 7.08 | 163.22 | 100.34 | 105.33 | −95.32 |
| 2 | 196 | 0.44 | 10 | 330 | 8.0 | 2.40 | 40726 | 287777 | 7.07 | 166.80 | 106.68 | 108.01 | −97.87 |
| 4 | 210 | 0.26 | 10 | 110 | 1.9 | 2.68 | 53581 | 416062 | 7.76 | 163.45 | 94.93 | 107.66 | −94.36 |
| 4 | 208 | 0.28 | 10 | 330 | 5.6 | 2.92 | 41005 | 306549 | 7.48 | 161.76 | 96.94 | 108.21 | −97.36 |
| 5 | 152 | 0.25 | 10 | 110 | 3.3 | 2.12 | 54548 | 373717 | 6.85 | 163.81 | 102.00 | 107.89 | −103.68 |
| 5 | 80 | 0.22 | 10 | 330 | 9.8 | 2.76 | 38778 | 272668 | 7.03 | 163.50 | 97.87 | 108.41 | −97.70 |
| 3 | 140 | 0.30 | 10 | 110 | 2.30 | 2.16 | 62767 | 404317 | 6.44 | 164.24 | 99.49 | 106.88 | −94.14 |
| 3 | 202 | 0.33 | 10 | 330 | 8.0 | 2.02 | 39975 | 265693 | 665 | 162.79 | 191.54 | 108.92 | −97.30 |

Note that some of the catalyst samples runs have been repeated. All of the catalysts using EHA in the synthesis gave high yields (especially the Samples No. 1) and low xylene solubles. Catalyst Sample No. 6, synthesized by reacting $SiCl_4$ with $Mg(OEt)_2$ followed by EHA, showed a slightly reduced MWD relative to the standard at high donor levels. However, at Al/Si=10 the distribution increased to a level above that for standard catalyst. The average of these values falls within "normal" values for standard catalyst. Catalyst Samples No. 7, which was synthesized by first reacting $SiCl_4$ with $Mg(OEt)_2$, was not subsequently treated with EHA. This catalyst gave a low productivity and low bulk density fluff. Having half of the donor present in the initial titanation gave a lower productivity catalyst (Sample 5)

Additional Comparative Sample Runs

Sample 9.

Same as Sample No. 6, except that the final TiCl$_4$ treatment was eliminated.

Sample 10.

Same as Sample No. 6 except that no 2-ethylhexanol (or any other alcohol) was added.

Sample 11.

Same as Sample No. 6, except that MgCl$_2$ was substituted for EtOMgCl, and SiCl$_4$ was first added to the MgCl$_2$.

Sample 12.

Same as Sample No. 6, except that MgCl$_2$ was substituted for EtOMgCl.

Polymerization was conducted using Samples 9–12.

The results for the comparative Sample Nos. 9–12 are presented the following Table 5.

| Sample No. | Al/Si | H$_2$ mmol | Yield (g) | BD (g/cc) | MF (g/10 min) | XS |
|---|---|---|---|---|---|---|
| 9 | 10 | 16 | 72 | 0.33 | 3.3 | 1.79 |
| 9 | 50 | 16 | 126 | 0.37 | 4.6 | 2.27 |
| 10 | 10 | 16 | 50 | 0.32 | 10 | 5.61 |
| 10 | 50 | 16 | 72 | 0.31 | 11.8 | 8.26 |
| 11 | 10 | 16 | 14 | | 6.0 | 4.45 |
| 11 | 50 | 16 | 18 | | 8.6 | 5.70 |
| 12 | 10 | 16 | 40 | 0.33 | 5.2 | 4.18 |
| 12 | 50 | 16 | 46 | 0.32 | 9.2 | 1.27 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

I claim:

1. A process for preparing a catalyst comprising:
   (a) contacting a metal compound of the formula M(OR)X with a hydrocarbon solvent to form a slurry, wherein M is magnesium, O is oxygen, R is a hydrocarbyl having from 1 to 20 carbon atoms and X is halogen;
   (b) adding 2-ethylhexanol to the slurry of step (a) to solubilize the M(OR)X of step (a) into the hydrocarbon solvent and form a solution;
   (c) contacting the solution of step (b) with titanium tetrachloride to precipitate a solid product;
   (d) contacting the solid product of step (c) with titanium tetrachloride and di-n-butyl phthalate to form an intermediate product; and
   (e) contacting the intermediate product of step (d) with titanium tetrachloride to form a catalyst component.

2. The method of claim 1 wherein X is chlorine or bromine.

3. The method of claim 1 wherein for the steps (e) and (d) contacting occurs at a temperature in the range of about 50° C. to about 90° C., and further comprise heating to a temperature in the range of about 90° C. to about 150° C. for about 0.5 hours to about 8 hours.

4. The method of claim 3 wherein step (a) is carried out at a temperature in the range of about 0° C. to about 100° C., a pressure in the range of about 15 psi to about 50 psi, and for a reaction time in the range of about 0.5 to about 4 hours.

5. The method of claim 1 wherein the amount of titanium tetrachloride in step (e) is in the range of about 0.5 to about 5 equivalents based on the metal compound of step (a).

6. A process for preparing a catalyst comprising:
   (a) contacting a metal compound of the formula M(OR)$_2$ or M(OR)X with a halogenating agent to form a halogenated product, wherein M is magnesium, O is oxygen, R is a hydrocarbyl having from 1 to 20 carbon atoms and X is halogen;
   (b) contacting the halogenated product of step (a) with a hydrocarbon solvent to form a slurry;
   (c) adding 2-ethylhexanol to the slurry of step (b) to solubilize the halogenated product of step (a) into the hydrocarbon solvent and form a solution;
   (d) contacting the solution of step (c) with titanium tetrachloride to precipitate a solid product;
   (e) contacting the solid product of step (d) with titanium tetrachloride and di-n-butyl phthalate to form an intermediate product; and
   (f) contacting the intermediate product of step (e) with titanium tetrachloride to form a catalyst component.

7. The method of claim 6 wherein for the steps (d) and (e) the contacting occurs at a temperature in the range of about 50° C. to about 90° C., and further comprise heating to a temperature in the range of about 90° C. to about 150° C. for about 0.5 hours to about 8 hours.

8. The method of claim 6 wherein the amount of titanium tetrachloride in steps (d) and (e) is in the range of about 0.5 to about 5 equivalents based on the metal compound of step (a).

9. The method of claim 6 wherein X is chlorine or bromine.

* * * * *